US 11,387,619 B2
Jul. 12, 2022

(12) United States Patent
Caplette et al.

(10) Patent No.: US 11,387,619 B2
(45) Date of Patent: Jul. 12, 2022

(54) MICRO-OPTICAL BENCH ARCHITECTURE FOR MASTER OSCILLATOR POWER AMPLIFIER (MOPA)

(71) Applicants: ITF Technologies Inc., Montreal (CA); O-Net Communications (Shenzhen) Limited, Guangdong (CN)

(72) Inventors: Stéphane Caplette, Montreal (CA); Hong Xie, Hangzhou (CN); Nigel Holehouse, Montreal (CA); Julien Magné, Montreal (CA)

(73) Assignees: ITF TECHNOLOGIES INC., Montreal (CA); O-NET COMMUNICATIONS (SHENZHEN) LIMITED, Guangdong (CN)

( * ) Notice: Subject to any disclaimer, the term of this patent is extended or adjusted under 35 U.S.C. 154(b) by 299 days.

(21) Appl. No.: 16/811,696

(22) Filed: Mar. 6, 2020

(65) Prior Publication Data
US 2020/0212645 A1 Jul. 2, 2020

Related U.S. Application Data

(63) Continuation of application No. PCT/CN2018/104422, filed on Sep. 6, 2018.
(Continued)

(51) Int. Cl.
*H01S 3/30* (2006.01)
*H01S 3/067* (2006.01)
(Continued)

(52) U.S. Cl.
CPC ...... *H01S 3/06704* (2013.01); *H01S 3/06754* (2013.01); *H01S 3/06758* (2013.01);
(Continued)

(58) Field of Classification Search
CPC .......... H01S 3/094003; H01S 3/06754; H01S 3/0333; H01S 3/2308; H01S 3/0064;
(Continued)

(56) References Cited

U.S. PATENT DOCUMENTS 5,506,723 A    4/1996 Junginger
6,008,933 A    12/1999 Grubb et al.
(Continued)

FOREIGN PATENT DOCUMENTS

CN    2381070 Y    5/2000
CN    101013247 A    8/2007
(Continued)

OTHER PUBLICATIONS

Notice of Reasons for Refusal dated Apr. 27, 2021 for Japanese Patent Application No. 2020-513311 (16 pages).
(Continued)

*Primary Examiner* — Kinam Park
(74) *Attorney, Agent, or Firm* — Perkins Coie LLP

(57) ABSTRACT

An optical system allows sharing of optical components and seed and pump light to achieve desired optical amplification in laser light while reducing the number of optical components and complexity of the overall optical system and achieving improved performance in lasers and reduced cost in fabrication and final lasers for large scale production of such lasers. Different optical gain sections can be used to allow for sharing of seed and pump light and sharing of optical components while providing multi-stage optical amplification.

30 Claims, 4 Drawing Sheets

Related U.S. Application Data

(60) Provisional application No. 62/554,988, filed on Sep. 6, 2017.

(51) Int. Cl.
  *H01S 3/094* (2006.01)
  *H01S 3/23* (2006.01)
  *H01S 3/00* (2006.01)
  *H01S 3/0941* (2006.01)

(52) U.S. Cl.
  CPC ...... *H01S 3/094003* (2013.01); *H01S 3/0064* (2013.01); *H01S 3/0078* (2013.01); *H01S 3/06712* (2013.01); *H01S 3/09415* (2013.01); *H01S 3/094069* (2013.01); *H01S 3/2333* (2013.01)

(58) Field of Classification Search
  CPC ............ H01S 3/0078; H01S 3/094069; H01S 3/06758; H01S 3/06712; H01S 3/06704; H01S 3/09408
  See application file for complete search history.

(56) References Cited

U.S. PATENT DOCUMENTS

| | | | |
|---|---|---|---|
| 6,583,925 B1 | 6/2003 | Delavaux et al. | |
| 7,876,498 B1* | 1/2011 | Honea | H01S 3/06758 359/341.43 |
| 9,042,007 B1* | 5/2015 | Qiao | H01S 3/06758 359/341.32 |
| 10,348,051 B1* | 7/2019 | Shah | H01S 3/06783 |
| 2007/0268942 A1 | 11/2007 | Murison et al. | |
| 2008/0181266 A1* | 7/2008 | Deladurantaye | H01S 3/06758 372/25 |
| 2011/0096320 A1 | 4/2011 | Krupkin et al. | |
| 2017/0155225 A1* | 6/2017 | Villeneuve | H01S 3/06758 |
| 2018/0159296 A1* | 6/2018 | Johnson | H01S 3/06758 |
| 2019/0140416 A1* | 5/2019 | Abedin | H01S 3/06758 |

FOREIGN PATENT DOCUMENTS

| | | |
|---|---|---|
| CN | 102280803 A | 12/2011 |
| CN | 103368048 A | 10/2013 |
| CN | 204835193 U | 12/2015 |
| JP | H07226560 A | 8/1995 |
| JP | H09162468 A | 6/1997 |
| JP | H11135865 A | 5/1999 |
| JP | H11274625 A | 10/1999 |
| JP | 2001217491 A | 8/2001 |
| JP | 2002261363 A | 9/2002 |
| JP | 2003188444 A | 7/2003 |
| JP | 2005093817 A | 4/2005 |
| JP | 2009533881 A | 9/2009 |
| JP | 2010505268 A | 2/2010 |
| JP | 2012054349 A | 3/2012 |
| JP | 2016025346 A | 2/2016 |
| KR | 20070074900 A | 7/2007 |
| WO | 2007103898 A2 | 9/2007 |

OTHER PUBLICATIONS

International Search Report and Written Opinion dated Dec. 12, 2018 for International Application No. PCT/CN2018/104422, filed on Sep. 6, 2018 (9 pages).

Extended European Search Report dated May 14, 2021 for European Patent Application No. 18852926.7 (34 pages).

Notice of Reasons for Refusal dated Nov. 24, 2021 for Japanese Patent Application No. 2020-513311 (6 pages).

\* cited by examiner

MICRO-OPTICAL BENCH ARCHITECTURE FOR MASTER OSCILLATOR POWER AMPLIFIER (MOPA)

CROSS REFERENCE TO RELATED APPLICATIONS

This patent document is a continuation of and claims priority to International Patent Application No. PCT/CN2018/104422, filed on Sep. 6, 2018, which claims the benefit of priority of U.S. Provisional Patent Application No. 62/554,988, filed on Sep. 6, 2017. The entire contents of the before-mentioned patent applications are incorporated by reference as part of the disclosure of this application

TECHNICAL FIELD

This patent document relates to optical amplifiers and lasers.

BACKGROUND

A laser system may implement one or more optical amplifiers to amplify the power of a laser to achieve a desired laser power level beyond the power range of the laser which may be in various laser configurations such as a diode laser or a solid-state bulk laser. A master oscillator power amplifier (MOPA) is such a laser system that includes a master laser as a seed laser to produce the original laser light and one or more optical amplifiers to amplify the original laser light.

SUMMARY

The technology disclosed in this patent document can be implemented to provide an optical system that allows sharing of optical components and seed and pump light to achieve desired optical amplification in laser light while reducing the number of optical components and complexity of the overall optical system and achieving improved performance in lasers and reduced cost in fabrication and final lasers for large scale production of such lasers. Different optical gain sections can be used to allow for sharing of seed and pump light and sharing of optical components while providing multi-stage optical amplification. The optical gain sections can be implemented by various optical gain media, including doped fiber sections, doped crystal gain media, or semiconductor optical amplifiers.

In some implementations of the disclosed technology, a master oscillator power amplifier (MOPA) can be constructed on a support base to mix fiber-guided sections including gain sections and free-space optical sections to reduce unnecessary propagation of amplified laser light in fiber for reducing undesired optical nonlinear effects in the laser output and to facilitate sharing of optical components and pump and seed light in laser operations.

For example, the disclosed technology can be implemented to construct a laser system having shared pump and seed light in different optical amplification sections that includes a support base as an optical bench; a seed laser on the support base to produce seed laser light at a seed laser wavelength; a pump light source on the support base to produce pump laser light at a pump laser wavelength different from the seed laser wavelength; a first free-space optical module on the support base and located to receive both the seed laser light from the seed laser and the pump laser light from the pump light source to produce a combined laser beam that combines the received pump laser light and the seed laser light; a first fiber collimator on the support base to receive in free space the combined laser beam from the first free-space optical module; a first fiber gain section including a first fiber terminal coupled to the first fiber collimator to receive the combined laser beam, a second opposite fiber terminal and a doped gain fiber section between the first and second fiber terminals to convert energy of the pump laser light in the combined laser beam into energy of the seed laser light to produce amplified seed laser light; and a first optical reflector located to reflect light at the seed laser wavelength back to the doped gain fiber section to be amplified for a second time as a reflected amplified seed laser light beam at the first fiber terminal while transmitting light at the pump laser light wavelength as a residual pump laser beam to the second fiber terminal. The reflected amplified seed laser light beam at the first fiber terminal is received by the first fiber collimator and is directed in free space to the first free-space optical module. This laser system includes a second fiber collimator on the support base and coupled to the second fiber terminal of the first fiber gain section to direct the residual pump laser beam out of the first fiber gain section into free space over the support base; a third fiber collimator on the support base to receive the reflected amplified seed laser light beam in free space from the first free-space optical module; a second fiber gain section including a first fiber terminal coupled to the third fiber collimator to receive the reflected amplified seed laser light beam from the first fiber gain section, a second opposite fiber terminal and a doped gain fiber section between the first and second fiber terminals to convert energy of the pump laser light in the combined laser beam into energy of the seed laser light to produce amplified seed laser light; a fourth fiber collimator on the support base and coupled to the second terminal of the second fiber gain section, the fourth fiber collimator located to receive in free space the residual pump laser beam from the second fiber collimator to provide pump light at the doped gain fiber section in the second fiber gain section in an opposite direction of the reflected amplified seed laser light beam from the first fiber gain section to amplify the reflected amplified seed laser light beam as an amplified transmitted seed laser beam to exit the second fiber gain section at the fourth fiber collimator, and a second free-space optical module coupled between the fourth fiber collimator and the second fiber collimator to guide the residual pump laser beam from the second fiber collimator into the fourth fiber collimator and to further guide the amplified transmitted seed laser beam from the fourth fiber collimator as an output of the laser system. The first and second free-space optical modules in the above implementation can be used to reduce unnecessary propagation of amplified laser light in fiber for reducing undesired optical nonlinear effects on the laser output and to facilitate sharing of optical components and pump and seed light in laser operations between the first and second fiber gain sections.

For another example, the disclosed technology can be implemented to construct a MOPA system having shared pump and seed light in different optical amplification sections. This system includes a support base as an optical bench; a seed laser on the support base to produce seed laser light at a seed laser wavelength; and a pump light source on the support base to produce pump laser light at a pump laser wavelength different from the seed laser wavelength. The system includes a first fiber gain section coupled to receive the seed laser light and the pump laser light and structured to include a doped gain fiber section which converts energy of the pump laser light into energy of the seed laser light to produce amplified seed laser light; a second fiber gain section coupled to receive the amplified seed light from the first fiber gain section and structured to include a doped gain fiber section to convert energy of the pump laser light into energy of the seed laser light to produce amplified seed laser light; a third fiber gain section coupled to receive the amplified seed light from the second fiber gain section and structured to include a doped gain fiber section to convert energy of the pump laser light into energy of the seed laser light to produce amplified seed laser light; and an optical splitter coupled to receive the pump laser light from the pump light source and to split the pump laser light into a first pump beam coupled into the first and second gain fiber sections and a second pump beam coupled into the third gain fiber section.

The above and other features and their implementations are described in greater detail in the description, the drawings and the claims.

DETAILED DESCRIPTION

Figure 1:
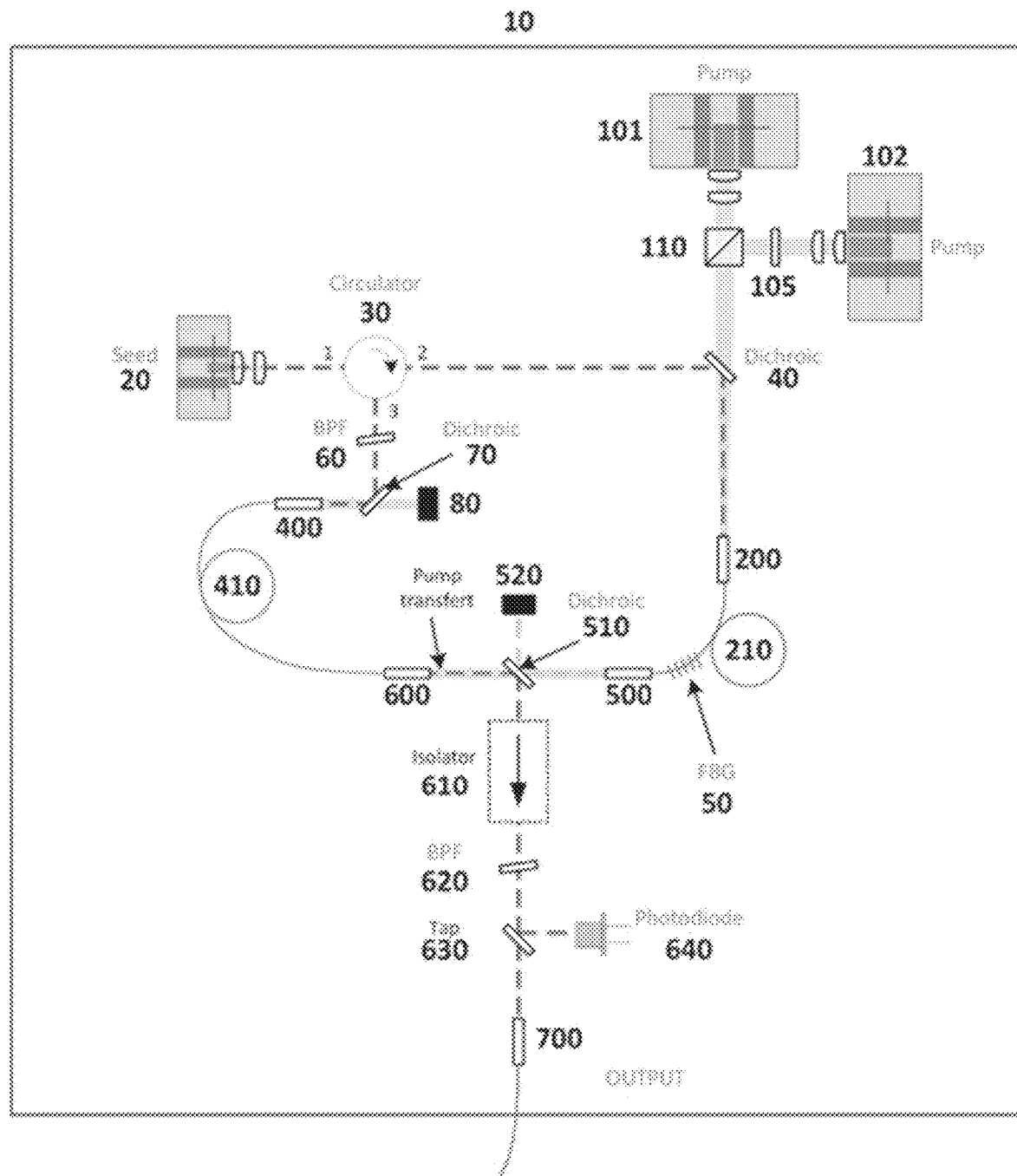
FIG. 1 shows an example of a master oscillator power amplifier (MOPA) system based on the disclosed technology using two fiber gain sections to achieve a 3-stage amplification by using a double-pass design for one fiber gain section and sharing of pump light in the two fiber gain sections and optical components.

Various designs for a master oscillator power amplifier (MOPA) tend to have complex optical structures with various optical components. Amplified light produced by fiber amplifiers, when guided in a fiber section, can experience significant nonlinear optical effects in the fiber section at the elevated power levels due to the optical amplification. Such nonlinear optical effects can be reduced by reducing the fiber guided section in a MOPA while adding a free-space optical section. In MOPAs, it may also be desirable to have more than one optical amplification sections to increase the overall optical amplification. The disclosed technology can be implemented to provide sharing of optical components and sharing of seed and pump light between two different optical amplification sections The disclosed technology can be used to construct, for example, a laser system having shared pump and seed light in different optical amplification sections. Such a laser system can include a support base as an optical bench; a seed laser on the support base to produce seed laser light at a seed laser wavelength; a pump light source on the support base to produce pump laser light at a pump laser wavelength different from the seed laser wavelength; a first free-space optical module on the support base and located to receive both the seed laser light from the seed laser and the pump laser light from the pump light source to produce a combined laser beam that combines the received pump laser light and the seed laser light; a first optical gain section on the support base and coupled to receive the combined laser beam to convert energy of the pump laser light in the combined laser beam into energy of the seed laser light to produce amplified seed laser light; an optical reflector located to reflect light at the seed laser wavelength back to the first optical gain section to be amplified for a second time as a reflected amplified seed laser light beam while transmitting light at the pump laser light wavelength as a residual pump laser beam to the second fiber terminal, wherein the reflected amplified seed laser light beam is directed in free space to the first free-space optical module; a second optical gain section on the support base and coupled to receive the reflected amplified seed laser light beam from the first optical gain section via the first free-space optical module and to receive in free space the residual pump laser beam to provide pump light in an opposite direction of the reflected amplified seed laser light beam to amplify the reflected amplified seed laser light beam as an amplified transmitted seed laser beam; and a second free-space optical module coupled to guide the residual pump laser beam from the first optical gain section and to further guide the amplified transmitted seed laser beam from the second optical gain as an output of the laser system. In some implementations, the first or second optical gain section may include a bulk optical crystal doped to produce an optical gain at the seed laser wavelength under optical pumping at the pump laser wavelength. In other implementations, the first or second optical gain section may include a doped fiber gain section to produce an optical gain at the seed laser wavelength under optical pumping at the pump laser wavelength.

The examples provided below are related to a fiber-based Master Oscillator Power Amplifier (MOPA) by using doped fiber gain sections based on a new high optical gain architecture that is compact and is designed to be mass-produced at a low cost. Examples of applications for such amplifiers may be CATV optical amplifiers and laser light sources for Light Detection and Ranging (Lidar or LIDAR) systems, for example. The proposed architecture is compatible with different active fiber types (erbium, ytterbium and thulium-doped for example) making this MOPA architecture suitable for different wavelength ranges.

Notably, the disclosed technology can be used for various applications like lidar-based 3D mapping for the automotive industry requiring low cost (e.g., less than several hundred dollars by some automakers) pulsed laser sources that can be produced in very large volumes (millions of units). Considerable effort was put in developing lidar systems based on laser diodes with operating laser wavelength near 900 nm (e.g., 905 nm). Indeed, these laser diodes are inexpensive, very compact and can be mass produced. Today, however, there is a clear trend toward using fiber lasers instead of laser diodes in the industry. Firstly, fiber lasers advantageously operate at eye safe wavelength (1.5 um or 2 um for example) contrary to laser diodes operating around 900 nm. Secondly, fiber lasers have a near-perfect, (diffraction limited) beam quality, in other words, they can emit very low divergence Gaussian beams while laser diodes inherently have higher divergences and poorer beam qualities. This can severely limit the angular resolution of lidar systems based on laser diodes, producing images with insufficient resolutions, failing to detect smaller objects like tires on the road. While being both technically superior and safer than laser diodes, fiber lasers can be much more expensive and much more complex to build making their introduction to mass market like the automotive industry difficult. The disclosed technology can be used to alleviate this limitation with an innovative fiber amplifier design that can be mass-produced at a cost an order of magnitude less than today's available solutions. This new design may be useful for other applications like CATV amplifiers and is not restricted to be used in lidar systems.

The disclosed technology can be used to construct a new high gain MOPA architecture that can be produced in large volumes, i.e. several million units per year at a very low cost, e.g., less than $300. This can be difficult to achieve with some existing fiber based optical amplifier architectures even though the different components involved in the assembly of MOPAs are mature components already produced in large quantities for the fiber optic telecom market. A new approach is therefore required.

This new approach minimizes the number of components involved, for instance traditional 1.5 um MOPAs used in LIDAR applications may include two or three expensive pump laser diodes to achieve optical gains on the order of 50 dB. One notable aspect of the disclosed technology is that it can be implemented in a way for achieving a 50 dB optical amplification or more with a single pump laser. Optionally, more pump lasers can be added, for instance to extend the operating temperature range of the MOPA or improve its long term reliability by operating each pump at a lower current.

In another aspect, the disclosed technology can be implemented in ways that reduce or eliminate individual components packages to save costs and to reduce the device size. This simplification can also include the pump laser diode and the seed packaging. The new design can be characterized as a micro optical bench, where the majority of individual components are installed on a common substrate and protected by a hermetic or semi-hermetic lid. This architecture makes the assembly process compatible with fully automated pick-and-place equipment similar to what is used in the electronic industry.

In another aspect, the disclosed technology can be implemented in ways to reduce or eliminate passive optical fibers typically used in fiber-based MOPA designs and retain only the active (gain) fibers. This approach can eliminate the need for splicing optical fibers to improve reliability, and manufacturability on large scales. This can also significantly improve the performance of the amplifier at high optical peak powers. In this regard, nonlinear signal degradation can be reduced or minimized by avoiding using passive fibers, and minimizing optical fiber length in general.

For illustration purposes, specific implementation examples of the disclosed technology are described using a 940 nm pump, a 1550 nm seed laser and Er—Yb co-doped gain fibers. Other implementations may use other wavelengths for the seed and pump or to other gain fiber dopants.

FIG. 1 shows an example of a MOPA system based on the disclosed technology to use 2 gain fiber sections to achieve at least 3-stage amplification. Each gain fiber section is coupled to a pair of optical collimators which is a fiber and lens assembly to couple the light in or out of an optical fiber core or cladding of each gain fiber section. In some implementations, a collimator may include a beam expander endcap to reduce intensity at the air-glass interface.

In the example in FIG. 1, a 1550 nm seed laser (20) is injected in the input port (port 1) of a free space optical circulator (30) have three optical ports (1, 2 and 3). The seed laser light signal exits the circulator from port 2, and is then routed to a dichroic mirror (40) reflecting the 1550 nm light toward the core of a first gain fiber (210) through a collimator (200). The first gain fiber section (210) is coupled to or contains a fiber Bragg grating (FBG) (50) that is designed to transmit pump light while reflecting the seed laser light. To pump the first amplification stage, one or multiple pumps can be used, one would be cost efficient, several pumps would extend the operating temperature range or reliability of the MOPA. This specific example is a system with two pumps (101 and 102). emitting pump laser light at a desired pump wavelength, e.g., around 940 nm. The two pump beams may be in different optical polarization states and may be combined in polarization using a beam polarization combiner (110). In other implementations, wavelength combining could be employed. The combined pump beams are transmitted through the dichroic (40) and injected into the cladding of the gain fiber (210) through a collimator (200).

The 1550 nm seed laser signal is amplified by passing through the first gain fiber section (210) and the amplified seed laser light is reflected by the fiber Bragg grating (FBG) (50) for a second time in the backward direction to pass through the first gain fiber section (210). The twice amplified seed laser light signal exits the gain fiber (210) from the collimator (200) and is routed to the circulator port 2 for being routed to the second gain fiber section (410) from port 2 to port 3 by optical circulator (30). The 940-nm pump light from the collimator 200 is absorbed by the first gain fiber section (21) and the residual 940-nm pump light goes through the FBG, unaffected by the FBG and is sent to the cladding of a second optical fiber (410) after going through a dichroic mirror (510). The amplified spontaneous emission noise (ASE) propagating toward point (500) is eliminated thanks to the dichroic mirror (510) and sent to an absorber (520) (ASE dump port).

The amplified signal exiting the circulator (30) from port 3 is filtered using a narrow bandpass filter (60), reflected by a dichroic mirror (70) and injected into the core of the second gain fiber (410) through a collimator (400). The signal is amplified and then exits the gain fiber (410) through collimator (600). The signal is reflected by a dichroic mirror (510) toward a free space isolator (610), then an optional bandpass filter (620) and then an optional free space tap coupler (630). The tap coupler (630) extracts a small percentage of the amplified signal and sends it to an optional photodiode (640) that can be used for power monitoring purposes. The amplified signal exits the system either free space or fiber coupled using a fiber collimator (700).

The 940 nm pump light successively goes through the first gain fiber (210) then through a dichroic (510) to a second gain fiber (410). The residual 940 nm pump signal after the second gain fiber (410) exits at collimator (400) and is transmitted through a dichroic (70) to an absorber (80) (pump dump port).

This system is a Master Oscillator Power Amplifier (MOPA) converting a low power 1550 nm laser into a high-power signal with minimal distortion.

This example of MOPA system has 3 stages of amplification in two gain fiber sections. The first gain fiber section is a doublepass optical amplifier to provide two stages of amplification and the second stage is a single-pass counter-pumped optical amplifier.

This MOPA system may preferably be built to maintain the seed laser polarization state (polarization maintaining, PM) but could also be built non PM at the expense of an increased complexity and cost.

In some implementations, a Bandpass filter (60) and dichroic (70) could be combined into a narrowband dichroic.

Figure 2:
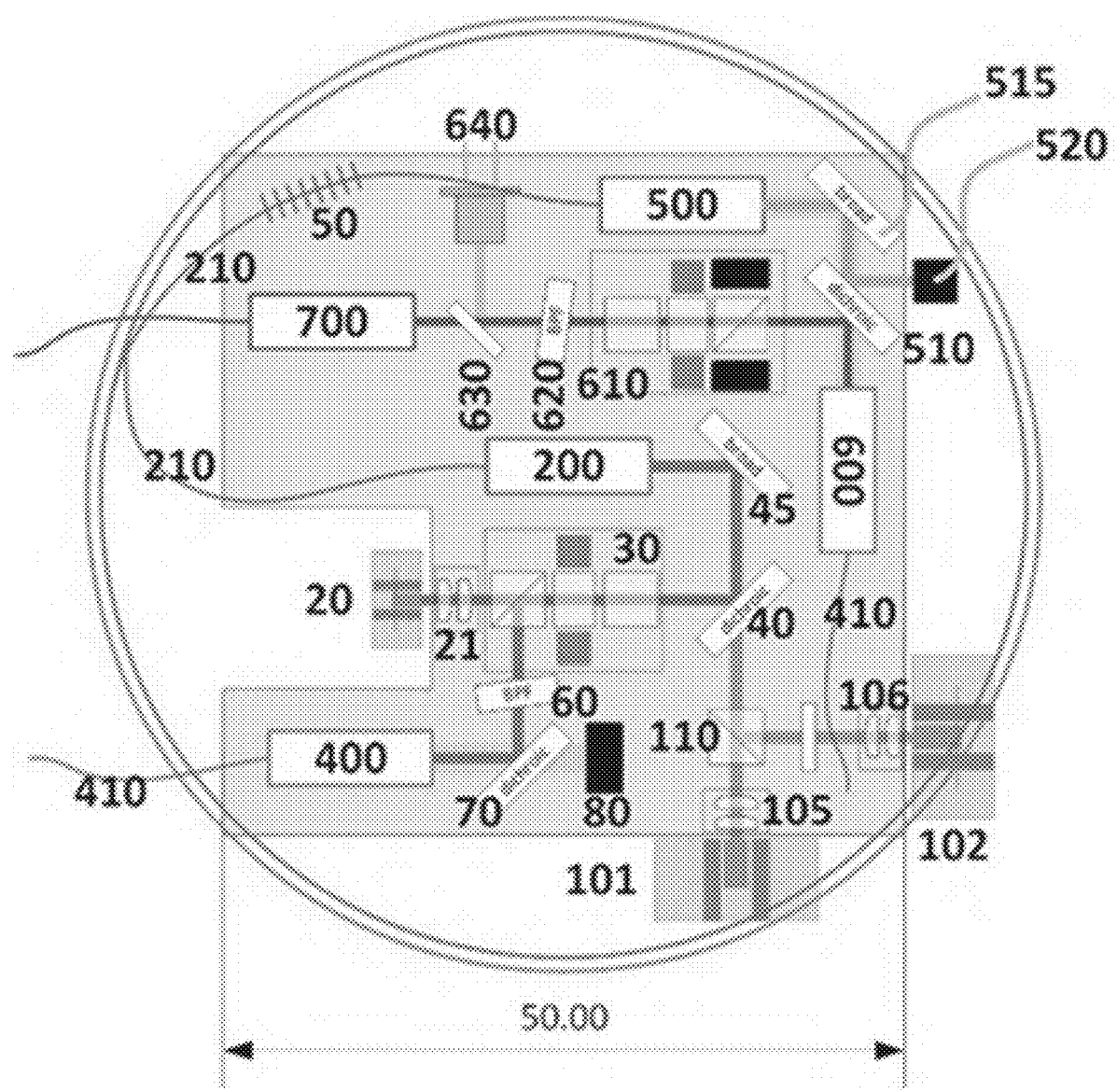
FIG. 2 shows an example of a master oscillator power amplifier (MOPA) system that implements the design in FIG. 1.

FIG. 2 illustrates an example of implementation of a low cost micro-optical bench MOPA architecture Lidar laser source in FIG. 1. This example uses free space diodes (e.g., Chip on Carrier laser diodes or CoC laser diodes) or fiber coupled pump laser as the seed laser. Light emitted by the fiber coupled seed laser (20) is collimated using lenses (21) (could be different). The collimated beam is then transmitted through a free space circulator (30) (which could be polarization sensitive or not) from port 1 to port 2, reflected by a 45° dichroic (40) and then coupled into the core of the $1^{st}$ gain fiber (210) through another collimator (200). The coupling optimization could be done by steering the seed collimating lenses (21) and/or the 45° dichroic (40) and/or the $1^{st}$ gain fiber collimator (200). To simplify the assembly, the circulator parts are completely fixed. This $1^{st}$ stage gain fiber (210) is pumped by two polarization combined free space (CoC) pumps emitting at 940 nm (101 and 102). Each pump is collimated using lenses (105 and 106) (could be different). This combined pump beam is transmitted through a 45° dichroic (40), then reflected by a 45° 940 nm/1550 nm mirror and coupled into the $1^{st}$ gain fiber cladding using a collimator (200). The pump NA and collimated beam diameter are designed to have efficient coupling in the cladding of the $1^{st}$ gain fiber (440) through the $1^{st}$ gain fiber collimator (200). Coupling optimization between the pumps and the $1^{st}$ gain fiber cladding can be done by steering the pumps collimating lenses (105 and 106) and/or the 45° pump mirror (45). To simplify the assembly, the polarization combiner cube (110) is fixed.

Signal from the seed laser is then be amplified in the $1^{st}$ stage gain fiber and reflected by a fiber Bragg grating (FBG) (50) written directly in the core of the $1^{st}$ gain fiber. This FBG grating is designed to have very high reflectivity at the signal wavelength and very low reflectivity at the pump wavelength (it can also be designed to have other function like removing ASE noise). After the reflection, the signal is amplified during a second pass in the $1^{st}$ gain fiber (210). This amplified signal then exits the $1^{st}$ gain fiber collimator (200) and reaches the circulator (30) port 2. In this direction, the light is transmitted from port 2 to port 3 in the circulator. The light exiting port 3 is transmitted through a bandpass filter (60), reflected by a 45° dichroic (70) and coupled into the core of the $2^{nd}$ gain fiber (410) using a collimator (400). Coupling optimization in the core of the $2^{nd}$ gain fiber (410) can be done by steering the 45° dichroic (70) and/or the $2^{nd}$ gain fiber collimator (400). The $1^{st}$ gain fiber length and pump absorption coefficient are chosen to absorb only a portion of the pump (in this example, 10-20%). The unabsorbed pump reaches the end of the $1^{st}$ gain fiber and is collimated using another collimator (500). The pump collimated beam is reflected by a 45° pump mirror (515), transmitted through a 45° dichroic (510) and coupled into the cladding of the $2^{nd}$ gain fiber (410) through a collimator (600). The coupling optimization can be done by steering the pump collimator (500) and/or the 45° pump mirror (515). The remaining 1550 nm signal exiting this collimator (500) is reflected by the 45° dichroic (510) and dumped (520). In this configuration, the $2^{nd}$ amplification stage signal is coupled at one end of the $2^{nd}$ stage gain fiber (410) through a collimator (400) and the pump is coupled through the other end through another collimator (600) making this stage counter-pumped, which is the optimum configuration to reduce non-linear effects. The unabsorbed pump light in the $2^{nd}$ gain fiber (410) is dumped (80) through the 45° dichroic (70). The signal is amplified in the $2^{nd}$ gain fiber (410) and exit through the collimator (600). This signal beam will be reflected by the 45° dichroic (510) and transmitted through a free space isolator (610) which could be polarization sensitive or not. A bandpass filter (620) can be added to remove ASE if necessary. Also, in some implementations, a free space tap (630) can be added to reflect a small portion of the beam into a free space photodiode (640) for monitoring purposes. The output can either exit the laser source free space or as in the example here fiber coupled using another collimator (700).

Components are approximately to scale and can be designed or configured to miniaturize or reduce the size of the assembly in practical product implementations.

Figure 3:
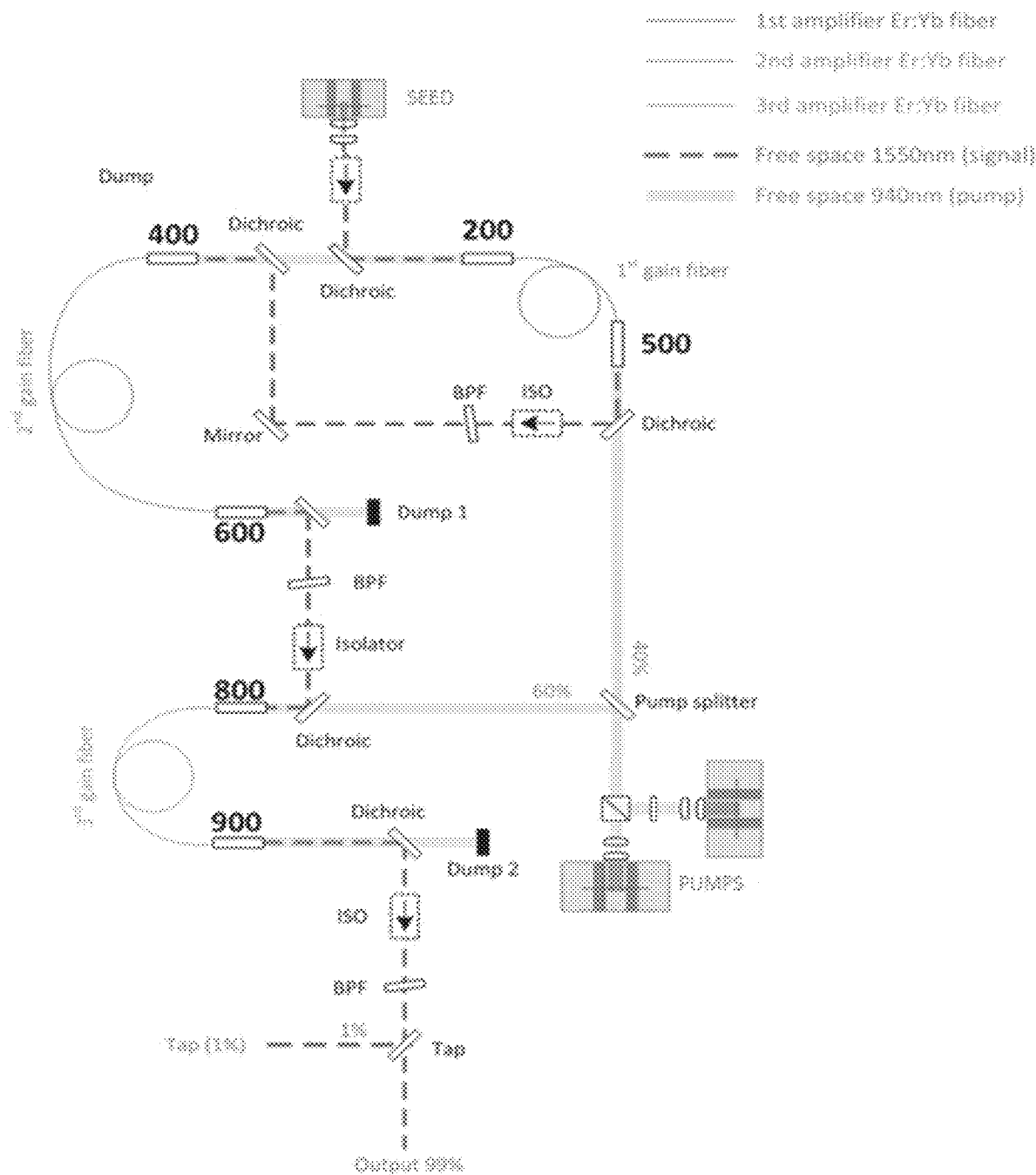
FIG. 3 shows an example of a master oscillator power amplifier (MOPA) system based on the disclosed technology using 3 gain fiber sections optically arranged in series to achieve a 3-stage amplification in a single-pass at each stage while sharing pump light.

FIG. 3 illustrates an alternative implementation of a micro-optical bench based on the disclosed technology. While retaining some of the features explained above, this particular MOPA implementation provides a single-pass amplifier architecture to provide sharing of components without using a double pass amplifier architecture in FIGS. 1 and 2. In this single-pass amplifier implementation, three amplification stages are implemented in 3 gain fiber sections, respectively, by using a single-pass in each gain fiber section.

Specifically, a seed laser is provided to produce seed laser light (e.g., at 1550 nm) and the seed laser light is directed by a first dichroic optical reflector to a first gain fiber section between first pair of fiber collimators (200 and 500). A second dichroic reflector is provided to redirect the amplified seed light out of the first fiber gain section to a third dichroic reflector to enter the second gain fiber section between a second pair of collimators (400 and 600) for the second stage amplification. A third gain fiber section is optically coupled between a third pair of collimators (800 and 900) to receive the amplified seed laser light out of the second gain fiber section to produce a third stage amplification to produce the final amplified seed laser light for output. Therefore, the three gain fiber sections are arranged optically in series to sequentially amplify the seed laser light in a single-pass configuration in each stage while sharing pump light.

The optical pump of the MOPA in FIG. 3 a pump source that produces the pump light (e.g., at 940 nm) and a pump splitter splits the pump light into two pump beams: a first pump beam for optically pumping the first and second gain fiber sections and a second pump beam for optically pumping the third gain fiber section. This pump source can be a single pump laser or a combination of different pump lasers. In the illustrated example in FIG. 3, the pump source is a combination of two pump lasers to produce multimode pump light. The pump splitter may be designed to split the pump light into the first and second pump beams with a defined split ratio (for example, 60%/40%). The first pump beam (e.g., 40%) is fed into the first stage gain fiber and via collimator 500, the second beam (e.g., 60%) is fed into the third stage gain fiber via collimator (800). Part of the first pump beam is absorbed in the first gain fiber and the remaining (unabsorbed) pump power is fed into the second gain fiber via collimators 200 and 400. The remaining pump light from the second gain fiber may be directed into a beam dump (e.g., dump 1) as shown in FIG. 3 where a dichroic reflector is provided to transmit the pump light into the dump 1 while reflecting the amplified seed laser light toward the third stage gain fiber section. As shown, a band-pass fiber (BPF) and an optical isolator are provided between the second and third stage gain fiber sections. In other implementations, the residual pump light out of the second stage gain fiber section may also be directed to the third stage gain fiber section to assist the optical pump at the third stage with the second pump beam.

In the illustrated example, the signal emitted by the seed laser is fed into the first gain fiber via collimator 200, the amplified output is routed to the second gain fibers via dichroic and optional band pass filters (BPF) to eliminate part of the amplified spontaneous emission. The signal enters the second gain fiber via collimator 400. The amplified signal exists the second gain fiber via collimator 600 and is routed to the third gain fiber via dichroic and optional band pass filters (BPF). The signal enters the third gain fiber via collimator 800, the amplified signal exits the third gain fiber via collimator 900. Isolators are used between each gain stage and at the output of the third stage. An optional band pass filter may be used at the output of the third stage. In addition, an optional tap can be inserted between the amplification stages, after the seed laser or at the output of the third stage to monitor the amplified signal.

In other implementations, this single-pass amplifier architecture may be modified to allow for counter directional pumping of the third stage, by injecting the pump via collimator 900 instead of collimator 600.

FIG. 3 shows an example of a MOPA system having shared pump and seed light in different optical amplification sections. This system includes a support base as an optical bench; a seed laser on the support base to produce seed laser light at a seed laser wavelength; and a pump light source on the support base to produce pump laser light at a pump laser wavelength different from the seed laser wavelength. The system includes a first fiber gain section coupled to receive the seed laser light and the pump laser light and structured to include a doped gain fiber section which converts energy of the pump laser light into energy of the seed laser light to produce amplified seed laser light; a second fiber gain section coupled to receive the amplified seed light from the first fiber gain section and structured to include a doped gain fiber section to convert energy of the pump laser light into energy of the seed laser light to produce amplified seed laser light; a third fiber gain section coupled to receive the amplified seed light from the second fiber gain section and structured to include a doped gain fiber section to convert energy of the pump laser light into energy of the seed laser light to produce amplified seed laser light; and an optical splitter coupled to receive the pump laser light from the pump light source and to split the pump laser light into a first pump beam coupled into the first and second gain fiber sections and a second pump beam coupled into the third gain fiber section.

Figure 4:
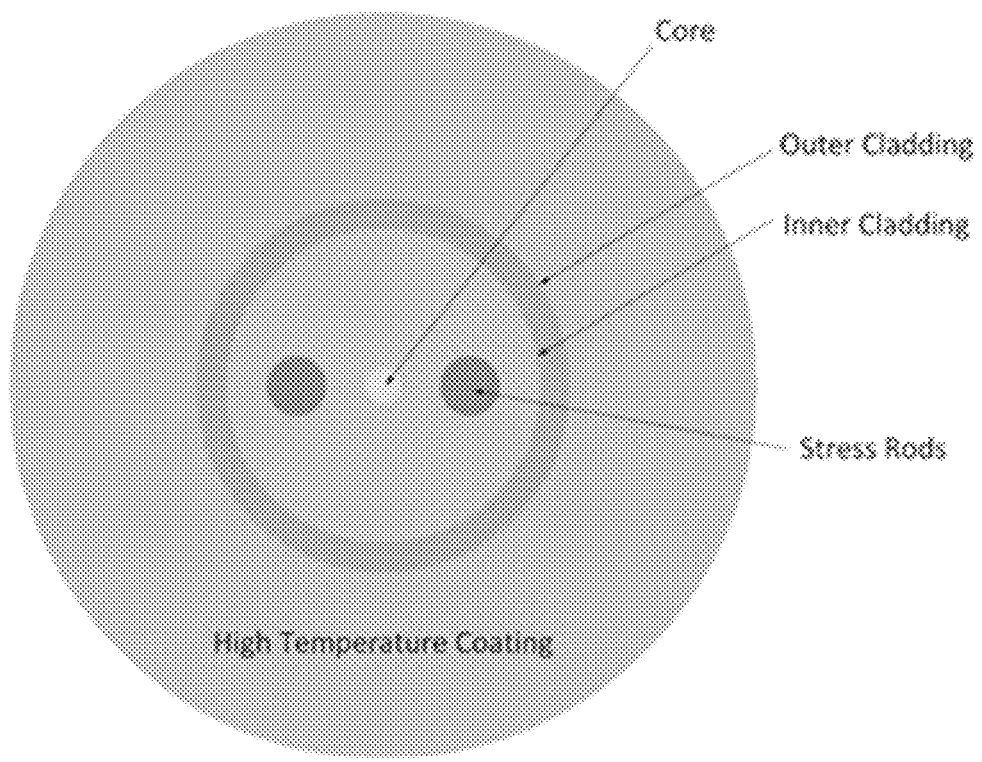
FIG. 4 shows an example of a gain fiber design for implementing the disclosed technology.

FIG. 4 shows an example of a specific all-glass gain fiber (also called triple clad or glass-glass fibers) design suitable for implanting the MOPA designs in FIGS. 1-3. Unlike double cladding fibers relying of polymers to guide pump light, this type of optical fiber relies only on doped glass to guide light making them inherently more robust against elevated external temperatures and higher humidity levels since polymers tend to be sensitive to these factors.

Therefore, the implementations of the disclosed technology may use all-glass fibers with polymer jackets to provide a mechanical protection. The optical properties of such jackets (e.g., optical absorption, refractive index etc.) can vary. An all glass fiber covered with a high temperature polymer can be used to allow for high temperature operation up to 150° C., while standard double cladding fibers are typically coated with low index polymers limited to temperature not exceeding 70° C. Additionally the requirements for the heat sink needed to extract the heat generated but the gain fiber are greatly reduced with this type of fiber. This essentially eliminates the need for an expensive heat sink, lowering cost and size.

In implementing the disclosed technology, the fiber for the fiber gain sections 210 and 410 may be polarization maintaining (PM) fiber based on various designs, including, e.g., panda or bow-tie PM fiber designs. A polarization maintaining fiber makes the MOPA system simpler and less expansive by eliminating optical parts necessary in a non PM version.

The pump guide (inner cladding) numerical aperture (NA) is usually limited to about 0.30 with all-glass fibers but can also conveniently set to a lower value. Indeed, to improve pump coupling between each stage, it is possible to keep the same pump guide diameter and increase the NA on the receiving side, allowing de-magnification. For example, the pump laser can be chosen to emit from a 105 um core fiber with a NA=0.15. The first amplification stage gain fiber pump guide can be chosen to have a higher NA (0.21 for example) with the same guide diameter of 105 um and the second stage can have a pump guide of 105 um with a NA of 0.27. By using a longer focal length lens in the emitting collimator than the receiving one, the pump can be focused tighter and still be 100% guided by the receiving fiber.

Therefore, the disclosed technology can be used to achieve more than 50 dB of signal gain can be achieved with a single low cost pump, to build a MOPA amplifier without passive fiber for improving reliability, manufacturability, reducing cost and non-linear effects (signal distortions). The common support base enables low cost and ease in manufacture using various available commercial components such as off-shelf components. A high temperature resistant design may be achieved by using all-glass fibers to avoid a relatively expensive heat sink for dissipating heat. Choosing a PM fiber simplifies the rest of the MOPA system making it cheaper.

As discussed above, one of the features of the disclosed technology is recirculating the pump from one gain section to another gain section in a multi-gain-section design. The amount of sharing of the pump between two gain sections can be controlled by selecting the optical interaction length of the first stage (e.g., the fiber length of the first fiber gain section) to allow for a given amount of pump to go through to the second pump. In designing the fiber gain sections, the numerical apertures of the fiber gain sections can be specifically selected/tuned to minimize the coupling losses.

This feature can be used in designs with non DCF/all-glass fibers, such as core pumped fiber amplifier designs (fibers where signal and pump are guided by the same guide: the fiber core), in Raman amplifiers. Various forms of optical gain media may be used in addition to the doped gain fibers, e.g., doped crystal gain media such as bulk crystals and semiconductor optical amplifier devices.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Only a few implementations and examples are described and other implementations, enhancements and variations can be made based on what is described and illustrated in this patent document.

What is claimed is what is disclosed and illustrated, including:

1. A laser system having shared pump and seed light in different optical amplification sections, comprising:

a support base as an optical bench;

a seed laser on the support base to produce seed laser light at a seed laser wavelength;

an optical circulator on the support base to include first, second and third optical ports for receiving and output laser light, the optical circulator spaced from the seed laser and located to receive the seed laser light in free space at the first optical port to direct the received seed laser light to the second optical port and to direct light received at the second optical port to the third optical port;

a pump light source on the support base to produce pump laser light at a pump laser wavelength different from the seed laser wavelength;

a first dichroic reflector on the support base and located to receive the pump laser light from the pump light source in free space and the seed laser light from the second optical port of the optical circulator in free space to produce a combined laser beam that combines the received pump laser light and the seed laser light, the first dichroic reflector configured to transmit light at the pump laser wavelength and reflect light at the seed laser wavelength;

a first fiber collimator on the support base to receive in free space the combined laser beam from the first dichroic reflector, a first fiber gain section including a first fiber terminal coupled to the first fiber collimator to receive the combined laser beam, a second opposite fiber terminal and a doped gain fiber section between the first and second fiber terminals to convert energy of the pump laser light in the combined laser beam into energy of the seed laser light to produce amplified seed laser light;

a fiber Bragg grating formed in the first fiber gain section between the second fiber terminal and the doped gain fiber section to reflect light at the seed laser wavelength back to the doped gain fiber section to be amplified for a second time as a reflected amplified seed laser light beam at the first fiber terminal while transmitting light at the pump laser light wavelength as a residual pump laser beam to the second fiber terminal, wherein the reflected amplified seed laser light beam at the first fiber terminal is received by the first fiber collimator and is directed in free space to the first dichroic reflector which further directs the reflected amplified seed laser light beam in free space back to the second optical port of the optical circulator, a second fiber collimator on the support base and coupled to the second fiber terminal of the first fiber gain section to direct the residual pump laser beam out of the first fiber gain section into free space over the support base;

a third fiber collimator on the support base to receive the reflected amplified seed laser light beam in free space from the third optical port of the optical circulator;

a second fiber gain section including a first fiber terminal coupled to the third fiber collimator to receive the reflected amplified seed laser light beam from the first fiber gain section, a second opposite fiber terminal and a doped gain fiber section between the first and second fiber terminals to convert energy of the pump laser light in the combined laser beam into energy of the seed laser light to produce amplified seed laser light; and a fourth fiber collimator on the support base and coupled to the second terminal of the second fiber gain section, the fourth fiber collimator located to receive in free space the residual pump laser beam from the second fiber collimator to provide pump light at the doped gain fiber section in the second fiber gain section in an opposite direction of the reflected amplified seed laser light beam from the first fiber gain section to amplify the reflected amplified seed laser light beam as an amplified transmitted seed laser beam to exit the second fiber gain section at the fourth fiber collimator.

2. The laser system as in claim 1, further comprising:
a second dichroic reflector on the support base between the fourth fiber collimator and the second fiber collimator to transmit the residual pump laser beam from the second fiber collimator in free space to the fourth fiber collimator while reflecting the amplified transmitted seed laser beam from the fourth fiber collimator.

3. The laser system as in claim 2, comprising:
an output fiber collimator on the support base to receive the amplified transmitted seed laser beam from the fourth fiber collimator, and
an output fiber coupled to the output fiber collimator to receive the amplified transmitted seed laser beam as a laser output of the laser system.

4. The laser system as in claim 3, comprising:
an output optical band pass filter on the support base between the fourth fiber collimator and the output fiber collimator to filter the amplified transmitted seed laser beam from the fourth fiber collimator to allow transmission of light at the laser seed wavelength while reducing light at other wavelengths.

5. The laser system as in claim 3, comprising:
an optical isolator on the support base between the fourth fiber collimator and the output fiber collimator to filter the amplified transmitted seed laser beam from the fourth fiber collimator.

6. The laser system as in claim 3, comprising:
an optical splitter on the support base between the fourth fiber collimator and the output fiber collimator to split a small portion of the amplified transmitted seed laser beam from the fourth fiber collimator as an optical monitor signal; and
an optical detector on the support base to receive the optical monitor signal to monitor output power of the amplified transmitted seed laser beam from the fourth fiber collimator.

7. The laser system as in claim 1, comprising:
an optical band pass filter on the support base between the optical circulator and the third fiber collimator to filter the reflected amplified seed laser light beam from the third optical port of the optical circulator to allow transmission of light at the laser seed wavelength while reducing light at other wavelengths.

8. The laser system as in claim 1, wherein the pump light source on the support base includes:
a first pump laser and a second pump laser on the support base and operable to produce first pump laser light and second pump light, respectively, at the pump laser wavelength; and
a beam combiner on the support base and located to combine the first pump light and the second pump light into the pump light that is directed to the first fiber collimator.

9. The laser system as in claim 1, wherein the pump light source on the support base includes a single pump laser.

10. The laser system as in claim 1, wherein the seed laser light wavelength is within a spectral range used in optical communications.

11. The laser system as in claim 10, wherein the spectral range used in optical communications includes 1550 nm.

12. The laser system as in claim 10, wherein the pump laser light wavelength is shorter than the seed laser light wavelength.

13. The laser system as in claim 1, wherein the first and second fiber gain sections are formed by polarization maintaining fiber sections.

14. The laser system as in claim 1, wherein each of the first and second fiber gain sections includes polarization maintaining fiber.

15. The laser system as in claim 1, wherein each of the first and second fiber gain sections includes all-glass fiber that sustain high operating temperatures over 100 C.

16. A laser system having shared pump and seed light in different optical amplification sections, comprising:
    a support base as an optical bench;
    a seed laser on the support base to produce seed laser light at a seed laser wavelength;
    a pump light source on the support base to produce pump laser light at a pump laser wavelength different from the seed laser wavelength;
    a first free-space optical module on the support base and located to receive both the seed laser light from the seed laser and the pump laser light from the pump light source to produce a combined laser beam that combines the received pump laser light and the seed laser light;
    a first fiber collimator on the support base to receive in free space the combined laser beam from the first free-space optical module;
    a first fiber gain section including a first fiber terminal coupled to the first fiber collimator to receive the combined laser beam, a second opposite fiber terminal and a doped gain fiber section between the first and second fiber terminals to convert energy of the pump laser light in the combined laser beam into energy of the seed laser light to produce amplified seed laser light;
    a first optical reflector located to reflect light at the seed laser wavelength back to the doped gain fiber section to be amplified for a second time as a reflected amplified seed laser light beam at the first fiber terminal while transmitting light at the pump laser light wavelength as a residual pump laser beam to the second fiber terminal, wherein the reflected amplified seed laser light beam at the first fiber terminal is received by the first fiber collimator and is directed in free space to the first free-space optical module;
    a second fiber collimator on the support base and coupled to the second fiber terminal of the first fiber gain section to direct the residual pump laser beam out of the first fiber gain section into free space over the support base;
    a third fiber collimator on the support base to receive the reflected amplified seed laser light beam in free space from the first free-space optical module;
    a second fiber gain section including a first fiber terminal coupled to the third fiber collimator to receive the reflected amplified seed laser light beam from the first fiber gain section, a second opposite fiber terminal and a doped gain fiber section between the first and second fiber terminals to convert energy of the pump laser light in the combined laser beam into energy of the seed laser light to produce amplified seed laser light;
    a fourth fiber collimator on the support base and coupled to the second terminal of the second fiber gain section, the fourth fiber collimator located to receive in free space the residual pump laser beam from the second fiber collimator to provide pump light at the doped gain fiber section in the second fiber gain section in an opposite direction of the reflected amplified seed laser light beam from the first fiber gain section to amplify the reflected amplified seed laser light beam as an amplified transmitted seed laser beam to exit the second fiber gain section at the fourth fiber collimator; and
    a second free-space optical module coupled between the fourth fiber collimator and the second fiber collimator to guide the residual pump laser beam from the second fiber collimator into the fourth fiber collimator and to further guide the amplified transmitted seed laser beam from the fourth fiber collimator as an output of the laser system.

17. The laser system as in claim 16, wherein each free-space optical module includes one or more optical components that direct light in free space without being confined in a fiber or optical waveguide.

18. The laser system as in claim 16, wherein the first free-space optical module includes a dichroic device with respect to light at the seed laser wavelength and the pump laser wavelength.

19. The laser system as sin claim 16, wherein the first free-space optical module includes a wavelength-selective beam combiner or splitter that directs light at the seed laser wavelength and light at the pump laser wavelength based on wavelength.

20. A laser system having shared pump and seed light in different optical amplification sections, comprising:
    a support base as an optical bench;
    a seed laser on the support base to produce seed laser light at a seed laser wavelength;
    a pump light source on the support base to produce pump laser light at a pump laser wavelength different from the seed laser wavelength;
    a first free-space optical module on the support base and located to receive both the seed laser light from the seed laser and the pump laser light from the pump light source to produce a combined laser beam that combines the received pump laser light and the seed laser light;
    a first optical gain section on the support base and coupled to receive the combined laser beam to convert energy of the pump laser light in the combined laser beam into energy of the seed laser light to produce amplified seed laser light;
    an optical reflector located to reflect light at the seed laser wavelength back to the first optical gain section to be amplified for a second time as a reflected amplified seed laser light beam while transmitting light at the pump laser light wavelength as a residual pump laser beam to the second fiber terminal, wherein the reflected amplified seed laser light beam is directed in free space to the first free-space optical module;
    a second optical gain section on the support base and coupled to receive the reflected amplified seed laser light beam from the first optical gain section via the first free-space optical module and to receive in free space the residual pump laser beam to provide pump light in an opposite direction of the reflected amplified seed laser light beam to amplify the reflected amplified seed laser light beam as an amplified transmitted seed laser beam; and a second free-space optical module coupled to guide the residual pump laser beam from the first optical gain section and to further guide the amplified transmitted seed laser beam from the second optical gain as an output of the laser system.

21. The laser system as in claim 20, wherein the first or second optical gain section includes a bulk optical crystal doped to produce an optical gain at the seed laser wavelength under optical pumping at the pump laser wavelength.

22. The laser system as in claim 20, wherein the first or second optical gain section includes a semiconductor optical amplifier (SOA) to produce an optical gain at the seed laser wavelength.

23. The laser system as in claim 20, wherein the first or second optical gain section includes a doped fiber gain section to produce an optical gain at the seed laser wavelength under optical pumping at the pump laser wavelength.

24. A laser system having shared pump and seed light in different optical amplification sections, comprising:
a support base as an optical bench;
a seed laser on the support base to produce seed laser light at a seed laser wavelength;
a pump light source on the support base to produce pump laser light at a pump laser wavelength different from the seed laser wavelength;
a first fiber gain section coupled to receive the seed laser light and the pump laser light and structured to include a doped gain fiber section which converts energy of the pump laser light into energy of the seed laser light to produce amplified seed laser light;
a second fiber gain section coupled to receive the amplified seed light from the first fiber gain section and structured to include a doped gain fiber section to convert energy of the pump laser light into energy of the seed laser light to produce amplified seed laser light;
a third fiber gain section coupled to receive the amplified seed light from the second fiber gain section and structured to include a doped gain fiber section to convert energy of the pump laser light into energy of the seed laser light to produce amplified seed laser light; and
an optical splitter coupled to receive the pump laser light from the pump light source and to split the pump laser light into a first pump beam coupled into the first and second gain fiber sections and a second pump beam coupled into the third gain fiber section.

25. The laser system as in claim 24, wherein the pump light source includes two laser diodes and a beam combiner that combines pump light from the two laser diodes into the pump laser light.

26. The laser system as in claim 24, comprising:
a first dichroic reflector placed in an optical path of the pump laser light and the seed laser light to reflect the seed laser light from the seed laser into the first fiber gain section while transmitting the pump laser light that pass through the first fiber section to the second fiber gain section; and
a second dichroic reflector placed in an optical path of the pump laser light and the seed laser light to reflect the seed laser light amplified by the first fiber gain section to a separate optical path leading to the second fiber gain section to be amplified by the second fiber gain section.

27. The laser system a sin claim 24, comprising:
a band pass filter between the first and second fiber gain sections to reduce an amplified spontaneous emission noise in the amplified seed laser light out of the first fiber gain section.

28. The laser system a sin claim 24, comprising:
a band pass filter coupled between the second and third fiber gain sections to reduce an amplified spontaneous emission noise in the amplified seed laser light out of the second fiber gain section.

29. The laser system a sin claim 24, comprising:
a first band pass filter coupled between the first and second fiber gain sections to reduce an amplified spontaneous emission noise in the amplified seed laser light out of the first fiber gain section; and
a second band pass filter coupled between the second and third fiber gain sections to reduce an amplified spontaneous emission noise in the amplified seed laser light out of the second fiber gain section.

30. The laser system a sin claim 24, comprising:
a band pass filter coupled to the third fiber gain section to reduce an amplified spontaneous emission noise in the amplified seed laser light out of the third fiber gain section.

* * * * *